United States Patent [19]

Shen et al.

[11] Patent Number: 5,624,542
[45] Date of Patent: *Apr. 29, 1997

[54] ENHANCEMENT OF MECHANICAL PROPERTIES OF CERAMIC MEMBRANES AND SOLID ELECTROLYTES

[75] Inventors: Yousheng Shen; Ashok V. Joshi; Dale M. Taylor, all of Salt Lake City; Michael J. Boettcher, West Jordan, all of Utah; Kevin Krist, Palatine, Ill.; Anil V. Virkar, Salt Lake City, Utah

[73] Assignee: Gas Research Institute, Chicago, Ill.

[*] Notice: The term of this patent shall not extend beyond the expiration date of Pat. No. 5,273,628.

[21] Appl. No.: 489,382

[22] Filed: Jun. 12, 1995

Related U.S. Application Data

[63] Continuation-in-part of Ser. No. 146,880, Nov. 1, 1993, Pat. No. 5,478,444, which is a continuation-in-part of Ser. No. 882,175, May 11, 1992, Pat. No. 5,273,628, and a continuation-in-part of Ser. No. 231,616, Apr. 22, 1994, Pat. No. 5,616,223, which is a continuation-in-part of Ser. No. 146,880, Nov. 1, 1993, Pat. No. 5,478,444, which is a continuation-in-part of Ser. No. 882,175, May 11, 1992, Pat. No. 5,273,628.

[51] Int. Cl.$^6$ .................................................. C25B 15/00
[52] U.S. Cl. .................... 204/283; 204/295; 429/33; 429/30; 501/103; 501/123; 501/126; 501/132; 501/134; 501/152; 419/19; 419/20; 419/23; 264/618; 205/344
[58] Field of Search .................... 204/295; 429/33, 429/30; 419/19, 20, 21, 23; 501/103, 123, 126, 132, 134, 152; 264/56, 65; 205/344

[56] References Cited

U.S. PATENT DOCUMENTS

| | | | |
|---|---|---|---|
| 3,956,194 | 5/1976 | Armand | 252/509 |
| 4,528,083 | 7/1985 | LaConti et al. | 204/265 |
| 4,793,904 | 12/1988 | Mazanec et al. | 205/334 |
| 4,802,958 | 2/1989 | Mazanec et al. | 205/338 |
| 4,803,134 | 2/1989 | Sammells | 429/16 |
| 4,812,329 | 3/1989 | Isenberg | 427/115 |
| 4,851,303 | 7/1989 | Madou et al. | 429/13 |
| 4,931,214 | 6/1990 | Worrell et al. | 252/520 |
| 4,933,054 | 6/1990 | Mazanec et al. | 205/338 |
| 5,006,494 | 4/1991 | Virkar | 501/152 |
| 5,134,042 | 7/1992 | Madou et al. | 429/13 |
| 5,213,911 | 5/1993 | Bloom et al. | 429/33 |
| 5,240,480 | 8/1993 | Thorogood et al. | 96/4 |
| 5,244,753 | 9/1993 | Taniguchi et al. | 429/33 |
| 5,273,628 | 12/1993 | Liu et al. | 204/59 R |
| 5,298,235 | 3/1994 | Worrell et al. | 429/33 |
| 5,306,411 | 4/1994 | Mazanec et al. | 204/265 |

FOREIGN PATENT DOCUMENTS

0399194  5/1990  European Pat. Off. .

OTHER PUBLICATIONS

Khandkar, A.C. and Joshi, A.V., Solid Electrolytes: Emerging Applications and Technologies, The Electrochemical Society Interface, 2, 26–33 (1993). *No month available.

Teracka, Y., Zhang, H., Furukawa, S. and Yamazoe, N., Oxygen Permeation Through Perovskite–Type Oxides, Chemistry Letters, 1743–1746, (1985). *No month available.

Tuan, W.H. and Brook, R.J., Journal of the European Ceramic Society, 6, 31–37 (1990). *No month available.

*Primary Examiner*—Bruce F. Bell
*Attorney, Agent, or Firm*—Speckman, Pauley & Fejer

[57] ABSTRACT

Enhancement of mechanical properties of ceramic membranes by introduction of a uniformly distributed high-temperature oxidation-resistant metal phase into the brittle ceramic phase to achieve mechanically strong ceramic/metal composites operable in an oxidation atmosphere and at elevated temperatures.

27 Claims, 1 Drawing Sheet

ENHANCEMENT OF MECHANICAL PROPERTIES OF CERAMIC MEMBRANES AND SOLID ELECTROLYTES

CROSS REFERENCE TO RELATED APPLICATIONS

This application is a continuation-in-part of application Ser. No. 08/146,880, filed Nov. 1, 1993, now U.S. Pat. No. 5,478,444 which is a continuation-in-part of application Ser. No. 07/882,175, filed May 11, 1992, now U.S. Pat. No. 5,273,628 and which is a continuation-in-part of application Ser. No. 08/231,616, filed Apr. 22, 1994, now U.S. Pat. No. 5,616,713 which is a continuation-in-part of application Ser. No. 08/146,880, filed Nov. 1, 1993, now U.S. Pat. No. 5,478,444 which is a continuation-in-part of application Ser. No. 07/882,175, filed May 11, 1992, now U.S. Pat. No. 5,273,628.

BACKGROUND OF THE INVENTION

1. Field of the Invention

This invention relates to enhancement of mechanical properties of ceramic membranes, such as solid electrolytes and mixed ionic-electronic conducting ceramic materials. Use of many ceramic materials, particularly of perovskite structure, has been limited due to poor mechanical properties. This invention provides enhancement of mechanical properties by introduction of a uniformly distributed, high-temperature oxidation-resistant metal phase into the brittle solid electrolyte or mixed ionic-electronic conducting ceramic materials to achieve mechanically strong ceramic/metal composites operable in an oxidation atmosphere and at elevated temperatures.

2. Description of Related Art

Much prior work has centered around stabilizing and increasing oxygen ion conduction of materials such as $Bi_2O_3$. High oxygen ion conduction compared to that of zirconia based electrolytes has been obtained using $Bi_2O_3$ doped with $Er_2O_3$ or $Tm_2O_3$, M. J. Verkerk and A. J. Burggraaf, J. Electrochem. Soc., 128, No. 1, 75–82 (1981), and using $Bi_2O_3$ doped with yttrium, P. J. Dordor, J. Tanaka and A. Watanabe, Solid State Ionics, 25, 177–181, (1987), and using $Bi_2O_3$ doped with $Yb_2O_3$, H. T. Cahen, T. G. M. Van Den Belt, J. H. W. De Wit and G. H. J. Broers, Solid State Ionics, 1, 411–423, (1980). Increasing oxygen ion conductivity and structural stabilization of the FCC phase of $Bi_2O_3$ based electrolytes has been investigated resulting in fast ion conduction in $Bi_2O_3$ doped with oxides of Y and Tb-Lu, H. T. Cahen, J. H. W. De Wit, A. Honders, G. H. J. Broers and J. P. M. Van Den Dungen, Solid State Ionics, 1, 425–440, (1980), and $Bi_2O_3$ doped with oxides of La, Nd, Sm, Dy, Er or Yb, H. Iwahara, T. Esaka, T. Sato and T. Takahashi, J. Solid State Chem., 39, 173–180, (1981), and $Bi_2O_3$ doped with oxides of Er and Dy, M. J. Verkerk and A. J. Burggraaf, Solid State Ionics, 3/4, 463–467, (1981). U.S. Pat. No. 5,006,494 teaches oxygen ion conductivity of $Bi_2O_3$ in the cubic form stabilized by 10–40 mole percent of a rare earth oxide such as yttria is greatly enhanced by inclusion of up to 10 mole percent of an oxide of a cation having a valence of 4 or greater, such as zirconia, hafnia, thoria, stannic oxide, tantalum oxide, and niobium oxide.

Mixed ionic-electronic conductors have been disclosed as solid electrolyte materials and for electrocatalysis: U.S. Pat. No. 4,793,904 teaches conversion of light hydrocarbons to synthesis gas using a solid electrolyte having a conductive metal or metal oxide coating on the cathode side which is capable of reducing oxygen to oxygen ions and a conductive coating on the anode side capable of catalyzing the oxidative conversion of methane or natural gas to synthesis gas with the solid electrolyte being a high ionic conductive material, preferably yttria or calcia stabilized zirconia, while also disclosing $Bi_2O_3$ stabilized by a lanthanide or calcium oxide; U.S. Pat. No. 4,933,054 teaches electrocatalytic oxidative conversion of saturated hydrocarbons to unsaturated hydrocarbons in an electrogenerative cell using a solid electrolyte having a conductive coating on each side, teaching the coating on the anode side may be bismuth and preferably mixtures of silver and bismuth, with the solid electrolyte being a high ionic conductive material, preferably yttria or calcia stabilized zirconia, while also disclosing $Bi_2O_3$ stabilized by a lanthanide or calcium oxide; U.S. Pat. No. 4,802,958 teaches electrocatalytic conversion of low molecular weight hydrocarbons to higher molecular weight hydrocarbons in an electrogenerative cell using a solid electrolyte coated with a metal or metal oxide coating on each side as taught in the 4,933,054 patent, the conductive metal or metal oxide coating on the cathode side being one capable of reducing oxygen to oxygen ions and the conductive metal or metal oxide coating on the anode side being capable of catalyzing the conversion of low molecular weight hydrocarbons to higher molecular weight hydrocarbons including bismuth oxide and preferably mixtures of bismuth oxide and silver; and U.S. Pat. No. 4,812,329 teaches a coating of oxygen-ionic-electronic conducting cerium and uranium oxide undoped or, preferably, doped with zirconia, thoria, or lanthanum oxides on cermet electrodes to provide electronic conduction for solid oxide electrochemical cells European Patent Publication No. 0 399 833 teaches multiphase mixtures of an electronically conductive material and an oxygen ion conductive material and solid membranes based upon $ABO_3$ perovskite materials, preferably containing small amounts or no bismuth.

Solid oxide electrolytes based upon metal-containing perovskite structures are known and exemplified by U.S. Pat. Nos.: 4,851,303; 5,134,042; 5,213,911; 5,244,753; 5,298,235; and 5,306,411.

Mixed ionic and electronic conducting oxidic materials based upon 25 to 98 mole percent cubic or tetragonal $ZrO_2$, 1.5 to 15 mole percent stabilizing oxide of alkaline earth metals, yttrium and/or rare earth metals, particularly oxides of Ca, Mg, Y, and 0.5 to 50 mole percent oxide V, Nb, Ta, Cr, Mb, W and/or Ti with usual impurities are taught by U.S. Pat. No. 4,931,214 to provide high current densities, operate at lower temperatures than present materials, provide conductivity independent of oxygen pressure and are useful in oxygen concentration cells, oxygen probes, fuel cells, and electrolysis cells. U.S. Pat. No. 3,956,194 teaches mixed electronic and ionic conductors for positive electrodes of electrochemical generators which are monophased graphite material having an alkali cation of Li, Na, K, Rb, Cs, or $NH_4$, a transition metal of Ti, V, Cr, Mn, Fe or Mo, and a non-metallic electronegative atom of O, S, F, Cl or Br.

Solid electrolytes, such as $ZrO_2$-based materials, and their oxygen ion transport properties are reviewed in Khandkar, A. C. and Joshi, A. V., Solid Electrolytes: Emerging Applications and Technologies, The Electrochemical Society Interface, 2, 26–33 (1993). Materials other than $ZrO_2$ and $CeO_2$-materials provide better oxygen ion transport properties, such as stabilized bismuth oxides as described in U.S. Pat. No. 5,273,628; perovskites $La_{x-1}Sr_xCo_{1-y}Fe_yO_{3-\delta}$ as described in Teracka, Y., Shang, H., Furukawa, S. and Yamazoe, N., Oxygen Permeation Through Perovskite Type Oxides, Chemistry Letters, 1743–1746, (1985); and perovskites $La_{1-x}Ba_xCo_{1-y}Fe_yO_{3-\delta}$ as described in U.S Pat. No.

5,240,480. Poor mechanical properties of these materials have restricted their use. The mechanical strength of yttrium stabilized bismuth oxide is usually low due to the weak bonding between the bismuth ions and oxygen ions, which limits its use as an electrolyte membrane in many electrochemical devices. Doping certain dopants into the crystal structure of the brittle materials, such as zirconia doped yttrium stabilized bismuth oxide as taught by U.S. Pat. No. 5,006,494, resulted in improved mechanical properties, but lowered oxygen ion conductivity of the material. Mixed ionic-electronic conducting perovskite materials are usually brittle, as recognized by the 5,240,480 patent which suggests a multi layer membrane with dense and porous layers to provide improved mechanical properties. Additionally, many perovskites have phase transformations between about 300° and 1200° C., and therefore cracking frequently occurs during formation of the perovskites by solid state sintering or it occurs later during thermal cycling.

A method for increasing the mechanical strength and ductility of brittle ceramic materials by introduction of metal nickel inclusions into $Al_2O_3$ matrix by sintering green powder compacts of an admixture of $Al_2O_3$ and NiO powders surrounded by a graphite powder bed to reduce NiO to Ni in situ is taught by Tuan, W. H. and Brook, R. J., Journal of the European Ceramic Society, 6, 31–37, (1990). Production of the $Ni/Al_2O_3$ composite as taught by Tuan, et al, supra, required sintering temperatures above the melting point of nickel which had a disadvantageous effect upon properties. Moreover, these techniques involve in situ formation of a metal phase under sub-atmospheric pressure at high temperatures, and, therefore, the materials can only be used for low temperature applications. If the materials are used at high temperatures, they must be kept under a reducing environment to avoid the metal phase being re-oxidized.

SUMMARY OF THE INVENTION

It is one object of this invention to provide ceramic membranes having improved resistance to cracking under thermal and mechanical stresses.

It is another object of this invention to provide ceramic solid electrolyte materials or solid mixed ionic-electronic conductor materials with improved mechanical properties.

Still another object is to provide ceramic materials having a uniformly distributed, high temperature oxidation-resistant metal second phase enhancing the mechanical properties of the composite material.

Yet another object is to provide thin membranes of composite ceramic-metal mixed ionic-electronic conductive materials having improved mechanical properties for use in electrochemical devices operated at elevated temperatures in an oxidation atmosphere.

When solid electrolyte materials or solid mixed ionic-electronic conductive materials are used in electrochemical devices, these materials are usually exposed to an oxidation environment at high temperatures. According to this invention, a high-temperature, oxidation-resistant metal phase incorporated into a ceramic material provides composites having a ceramic phase and a metal phase microstructure exhibiting improved mechanical properties and are suitable as thermally and mechanically strong materials under conditions of high temperatures and oxidation atmospheres. These ceramic/metal composite materials have greatly enhanced mechanical strength suitable for use as thin membranes at high temperatures and under oxidation conditions.

The ceramic/metal composite materials of this invention are produced by mixing calcined ceramic powder component having average particle size of about 1 to about 50 micrometers, preferably about 1 to about 10 micrometers, with metal component powder having average particle size of about 1 to about 50 micrometers, preferably about 1 to about 10 micrometers, in desired proportions forming a mixed ceramic/metal powder. The mixed powder is isostatically pressed according to methods known in the art to result in green products which are sintered in an oxidation atmosphere, preferably at oxygen partial pressure of about $10^{-6}$ to about 1 atmosphere, at high temperature, near but below the melting temperature of the metal, to form a sintered composite body of desired shape and having a high density, preferably greater than about 95% of the theoretical density.

BRIEF DESCRIPTION OF THE DRAWINGS

Achievement of the above objects and further advantages of this invention are more completely described with respect to preferred embodiments and reference to the drawings, wherein.

DESCRIPTION OF PREFERRED EMBODIMENTS

Enhancement of mechanical properties of ceramic materials, such as solid electrolytes and mixed ionic-electronic conducting membranes, is achieved according to this invention by incorporation of a uniformly distributed, high-temperature oxidation-proof metal phase into the ceramic material to obtain mechanically strong ceramic/metal composites suitable for use under oxidation conditions at high temperatures. The ceramic/metal phase composites of this invention are a composite structure on a micro scale, as compared to metal wire or particulate reinforcing of the ceramic material. The oxidation proof metal phase is believed to suppress or absorb stresses built up in the brittle ceramic material and thereby enhance both the strength and ductility of the ceramic/metal composites of this invention. Membranes produced according to this invention exhibit fracture strength $\sigma_f$ and critical stress intensity factor (mode I) $K_{Ic}$ increased by at least about 20 percent and up to several orders of magnitude, depending upon the metal content.

Suitable ceramic/metallic composites having enhanced mechanical properties, as compared to the ceramic material alone, according to this invention include mixed microstructure materials of about 50 to about 99, preferably about 50 to about 90, and most preferably about 60 to about 80, volume percent ceramic phase and about 1 to about 50, preferably about 10 to about 50, and most preferably about 20 to about 40, volume percent metal phase.

The ceramic phase of the ceramic/metal composite may be selected from oxides of metals selected from the group consisting of Bi, Ce, Th, Na, Cr, Y, Nb, Rb, Sr, Ba, Ni, Zr, La, Fe, Co, Mo, Hf, Ti, Cr and mixtures thereof. In one embodiment, suitable oxygen ion conducting metal oxide ceramic phase materials include cubic bismuth-, cerium-, hafnium-, thorium-, and zirconium- based oxides. The oxygen ion conducting metal oxide ceramic phase comprises cubic bismuth-, cerium-, hafnium-, thorium-, or zirconium-oxide and about 1 to about 50 mol % of an oxide stabilizer of a rare earth metal or alkaline earth metal oxide, preferably yttrium oxide or calcium oxide, calcium oxide being particularly preferred for stabilizing cerium oxide and yttrium oxide being particularly preferred for stabilizing bismuth or zirconium oxide. Preferred stabilizers include yttrium oxide, calcium oxide, erbium oxide, gadolinium oxide, ytterbium oxide, neodymium oxide and mixtures thereof. It is preferred that about 10 to about 50 mol % stabilizer be used with the bismuth oxide phase and about 5 to about 30 mol % stabilizer be used with the cerium oxide and zirconium oxide phase. In addition to its stabilizing function, the stabilizers also provide enhanced ionic and electronic conductivities to the primarily ionic conductive phase.

Other predominantly ionic conducting solid solutions may be used as the ionic conducting ceramic phase in this invention. For example, calcium oxide and/or yttrium oxide doped thorium oxide, beta-alumina sodium ion conductor, as well as other ionic conductors including hydrogen ion conductors such as $Ba_{2-x-y}Ce_xNb_yO_3$, silver ion conductors such as $RbAg_4I_5$, sodium ion conductors, lithium ion conductors, copper ion conductors, fluoride ion conductors, and the like, may be used. Mixed ionic/electronically conductive perovskite ceramic materials, such as those selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $Bi_{1-z}Sr_zCo_{1-w}Fe_wO_{3-\delta}$, $La_{1-z}Ba_zCo_{1-w}Fe_wO_{3-\delta}$, $SrFe_{1-z}Co_zC_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number of 0 to a positive or negative number of about 0.3 to satisfy valence requirements. By the terminology "derivative forms", we include the above perovskite materials which have been modified by adding a small amount of other additives or dopants while maintaining the original structure. In preferred embodiments, z is a positive numeral of about 0.05 to about 0.2 and w is a positive numeral of about 0.05 to about 0.2.

The high temperature oxidation-resistant metal phase can be any high temperature oxidation-resistant metal and is preferably a metal selected from Cu, Ag, Au, Zn, Cd, Mo, Fe, Ru, Os, Co, Rb, Ir, Ni, Pd, Pt and mixtures and alloys thereof, preferably Ag, Pd, Pt, Au and their alloys. When the amount of the metal phase is about 20 to 35 vol % and higher, the phase is continuous allowing the ratio of ionic to electronic conductivity of the mixed composite of this invention to be adjusted to any desired value from zero to unity by changing the amount of the predominantly electronic conductive phase.

Figure 1:
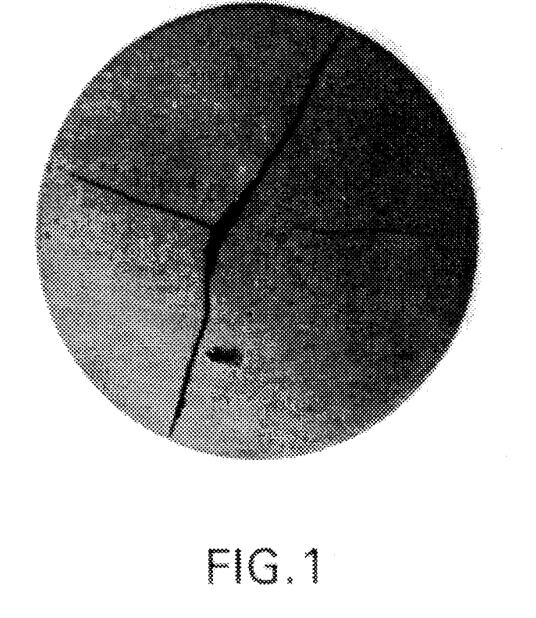
FIG. 1 is a photomicrograph of a 100 percent ceramic pellet prepared as described in Example II for comparison.
Figure 2:
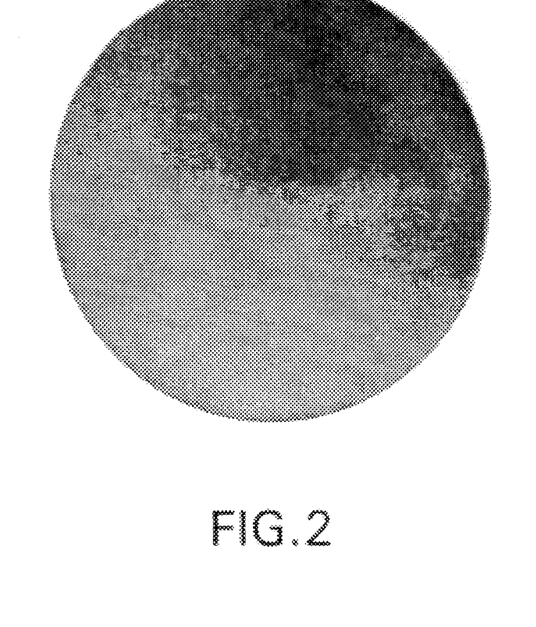
FIG. 2 is a photomicrograph of a 65 volume percent ceramic and 35 volume percent palladium composite ceramic/metal mixed ionically-electronically conductive material according to this invention prepared as described in Example II.

The microstructure of the composite non-homogeneous mixed material should have uniform distribution of the two phases, one being ceramic and the other being metal. The ceramic phase may have small agglomerates present. The two phases are desirably substantially chemically inert to each other and no other phases are present at the phase boundaries or elsewhere in the composite. FIG. 1 is a comparative photomicrograph, 25 mm across the field, of a 100 percent ceramic 4 mm thick pellet of $SrCo_{0.8}Fe_{0.2}O_{3-\delta}$ sintered at 1250° C. for 5 hours in air showing cracks resulting from sintering of the ceramic perovskite material. FIG. 2 is a photomicrograph, 25 mm across the field, of a typical mixed microstructure of the ceramic/metal composite 4 mm thick pellet according to this invention of $(SrCo_{0.8}Fe_{0.2}O_{3-\delta})_{65 vol.\%} Pd_{35 vol.\%}$ sintered at 1250° C. for 5 hours in air showing no cracking.

The ceramic phase of the mixed ceramic/metal composite of this invention is continuous. The metal phase of the mixed ceramic/metal composite of this invention is continuous when the volume percentage of that phase in the composite exceeds a specific amount for the particular system. Three dimensional photomicrographs are necessary to show whether the metal phase is continuous. We have found that with a $Bi_{1.5}Y_{0.5}O_3$ ceramic phase Ag obtains a continuous phase at about 20 to about 35 volume percent while Ag/Pd alloys obtain a continuous phase at slightly higher amounts. The poor wetability between the metal phase and the ceramic phase enhances formation of parallel two phase microstructures, avoiding the ionic block effect. Mixed ionic/electronic conductivity occurs when the electronic conducting metal phase is continuous. However, to obtain desired high ambipolar conductivity, it is preferred that the electronic conducting phase be present in slightly greater amount than necessary for obtaining a continuous electronic conducting phase, about 1 to about 5 volume percent greater being preferred.

The ceramic/metal composite materials of this invention may be produced by various methods. Generally, ceramic/metal composites may be produced by mixing and grinding of ceramic components with a metal powder, or metal oxide powder provided the metal oxide powder decomposes during sintering, followed by forming and sintering of the green body. One method of production of a mixed ionic-electronic conducting ceramic/metal composite, for example, is mixing desired proportions of oxide of bismuth and oxide of yttrium and calcining at a sufficiently high temperature and for a sufficient time to obtain yttria-stabilized bismuth oxides which may be verified by x-ray diffraction. The yttria-stabilized bismuth oxide calcined powder is mixed with the desired volume percentage of silver powder and ball-milled down to a particle size of about 0.5 to about 1 micron. A slurry is formed to which organic binder may be added and mixed by milling followed by drying. The powder may be screened through a #60 mesh screen and formed into desired shape by pressing. Another method is to tape cast the slurry of fine ceramic powder into films or membranes. The green material is then sintered in air at a sufficiently high temperature and for a sufficiently long time to result in a density of greater than about 95% of the theoretical value to avoid appreciable passage of molecular sized material through the membrane. The mixed oxygen ion and electron conducting gas-impervious membranes of this invention may also be produced by chemical vapor deposition, electrochemical vapor deposition, dip-coating processing, sol-gel processing, precipitation processing, or by other suitable processes.

Mixed ceramic/metal composite gas-impervious membranes having enhanced mechanical properties with a thickness of about 1 to about 2000 microns, preferably about 1 to about 1000 microns and most preferably about 1 to about 50 microns, may be formed having the non-homogeneous microstructure described above. By the term "membranes", we mean to include a variety of forms, such as, thin sheets, wafers, and the material formed into any desired shape, such as pellets, tubes, honeycombs, and the like for use in a wide variety of apparatus for oxygen separation and for catalysis, as well as for solid electrolytes.

The enhanced mechanical properties of the ceramic/metal composite materials of this invention render them particularly useful for thin membrane/electrolytes having mixed ionic-electronic conduction in pressure activated oxygen separation devices, wherein oxygen transport, by oxygen permeation from the cathode side to the anode side of the mixed ionic-electronic conducting electrolyte, has been recorded after an oxygen partial pressure gradient has been built up across the mixed conducting electrolyte. Higher oxygen exchange current density will be achieved when the thickness of the mixed conducting electrolyte is reduced, as is made possible by this invention, and the electrocatalysis is improved. Therefore, electrolytes produced from mixed ionic-electronic conducting ceramic/metal composite materials of the present invention produce a substantially more uninhibited incorporation and transport of oxygen ions from the cathode side to the anode and release of oxygen from the anode side of the mixed conducting electrolyte while electrons are spontaneously transported from the anode to the cathode side of the electrolyte without an external electrical circuit. When the ceramic/metal composite mixed ionic-electronic conducting material of this invention is used as an electrode in an electrochemical device, the incorporation of oxygen and electron exchange can take place on any boundaries between the two phase, solid mixed conductor and gas, contact areas. By comparison, in electronic conducting electrodes commonly used the charge transfer only takes place on the uni-dimensional boundary areas of the three phase contact of ionic conductor, electronic conductor, and gas. This offers advantages in use, of the ceramic/metal composite ionic-electronic conductors of this invention for oxygen exchange reactions, such as, in oxygen concentration cells, oxygen fuel cells, and electrolysis cells.

Since the incorporation of oxygen is catalytically activated by the introduction of metal electronic conduction in the electrolyte according to the present invention, the kinetics of oxygen reduction and evolution at the surfaces of the mixed ionic-electronic conducting electrolyte are even more favorable in comparison with the most commonly used expensive porous platinum which is often used as an electrode material in oxygen separation devices or other electrochemical devices where zirconium oxide or cerium oxide have been used as electrolytes. Using the ceramic/metal composite mixed ionic-electronic conducting bismuth oxide based electrolyte of this invention, oxygen sensors, fuel cells, and electrolysis cells can be operated at lower temperatures than those previously required.

The ceramic/metal composite according to this invention, providing enhanced mechanical properties, may be used in catalysis of wide variety of chemical reactions involving the removal of ions from material on one side of the membrane and provision of the ion to a different material of the other side of the membrane. In addition, the membranes of this invention may be used in conjunction with other structures, such as coatings and the like for electrodes in electrochemical and electrolysis reactions. The membranes according to this invention may be coated on either or both sides with a suitable electrocatalyst to aid in the desired electrochemical reactions. For example, a thin coating of a catalyst for oxygen reduction as known to the art may be applied to the side of the membrane in contact with compressed air and a thin coating of a catalyst for oxygen evolution or fuel oxidation may be applied to the opposite side to enhance a desired oxidative chemical reaction in the presence of a chemical reactant. Contacting the faces of the membrane with the desired gas reactants may be achieved in any manner known to the art for contacting each side of the membrane with a different gas.

The following Examples are set forth using specific materials and process conditions to illustrate this invention, and should not be considered to limit the invention in any manner.

EXAMPLE I

A $(La_{0.2}Sr_{0.8}Co_{0.8}Fe_{0.2}O_{3-\delta})_{90-60vol\%}(Ag_{70wt\%}Pd_{30wt\%})_{10-40vol\%}$ composition was prepared by first forming the perovskite powder by mixing 15.51 wt % $La_2(CO_3)_3$, 57.34 wt % $SrCO_3$, 21.75 wt % $Co_3O_4$ and 5.42 wt % $Fe_2O_3$ powders having average particle size of about 10 micrometer and grinding with 2 wt % of a commercial dispersant (Colloid #261, Rhone-Poulec, Marietta, Ga.) in an attrition mill for 24 hours in a methanol solution. The slurry was dried in air at 70° C. and passed through a sieve with a mesh size of 200 micrometers. The powder was then calcined at 900° C. in air for 10 hours to form the desired solid solution and crystal structure $La_{0.2}Sr_{0.8}Co_{0.8}Fe_{0.2}O_{3-\delta}$ mixed ionic-electronic conductive solid solution. This powder was mixed with $Ag_{70wt\%}Pd_{30wt\%}$ alloy powder having average particle size of about 1 micrometer in the following amounts to produce:

|  | $La_{0.2}Sr_{0.8}Co_{0.8}Fe_{0.2}O_{3-\delta}$ | | $Ag_{70\,wt\,\%}Pd_{30\,wt\,\%}$ | |
|---|---|---|---|---|
| Sample A | $90_{vol\%}$ | 74.4 wt % | $10_{vol\%}$ | 22.6 wt % |
| Sample B | $75_{vol\%}$ | 60.1 wt % | $25_{vol\%}$ | 39.2 wt % |
| Sample C | $60_{vol\%}$ | 43.7 wt % | $40_{vol\%}$ | 56.3 wt % | and each sample milled with 2 wt % of the above dispersant in a methanol solution for 24 hours. An amount of 0.5 wt % of a commercial organic binder (XUS, Dow Chemical Co. USA, Freeport, Tex.) was added to the slurry during the last hour of milling. Each slurry was dried in air at 70° C. and passed through a 200 micrometer sieve. Each of the sieved powder samples was isostatically pressed for 30 seconds at a pressure of 30,000 psi at room temperature and the resulting green samples had a density of about 60 percent of the theoretical density. The green samples were sintered in air at 1200° C. for 5 hours and the finished body was in bar shape, 5 mm×5 mm×50 mm for the four point bend test, or in short rod shape, 12.7 mm O.D.×25 mm length for the short rod fracture toughness test. The density of each formed composite body was measured by the Archimedes method, and the densities of each of the sintered composite materials was higher than 95 percent of the theoretical densities.

The samples were characterized using x-ray diffraction and an optical microscope for phase identification which confirmed that each of the samples had a $La_{0.2}Sr_{0.8}Co_{0.8}Fe_{0.2}O_{3-\delta}$ ceramic phase and a Ag/Pd metal phase. Mechanical properties of the samples were evaluated by the four point bend test as described by Dieter, George E., Mechanical Metallurgy, Third Edition, McGraw-Hill Book Company, New York, N.Y., 11, 348–353, (1986) and by the short rod fracture toughness test as described by Barker, L. M. and Baratta, F. I., Comparisons of Fracture Toughness Measurements by the Short Rod and ASTM Standard Method of Test for Plane-Strain Fracture Toughness of Metallic Materials (E 399-78), J. of Testing and Evaluation, 8, 3, 97–102, (1980). The results showed that the fracture strength $\sigma_f$ and the critical stress intensity factor (mode I) $K_{Ic}$ were increased in orders of magnitude. The results are shown in the following Table.

TABLE 1

| Material | | Fracture Strength | Critical Stress Intensity Factor |
|---|---|---|---|
| Ceramic vol % | Metal vol % | $\sigma_f$(MPa) | $K_{Ic}$ |
| 100 | 0 | 23.21 ± 1.8 | * |
| A  90 | 10 | 29.57 ± 2.1 | 1.04 ± 0.08 |

TABLE 1-continued

| | Material | | | Critical Stress |
|---|---|---|---|---|
| | Ceramic vol % | Metal vol % | Fracture Strength $\sigma_f$(MPa) | Intensity Factor $K_{Ic}$ |
| B | 75 | 25 | 69.70 ± 4.6 | Not Measured |
| C | 60 | 40 | 197.16 ± 11.2 | Not Measured |

*Without the metal phase, the material cracked and $K_{Ic}$ was not measured.

EXAMPLE II

A mixed ionic-electronic conductive solid solution powder of $SrCo_{0.8}Fe_{0.2}O_{3-\delta}$ was formed by calcination as described in Example I. The mixture of 64.80 wt % $SrCO_3$, 28.19 wt % $Co_3O_4$ and 7.01 wt % $Fe_2O_3$ powder having average particle size of about 10 micrometer was ground in a methanol solution in an attrition mill, the slurry dried in air, and calcined at 900° C. in air for 10 hours to form the solid solution phase. This powder was mixed with Pd powder having an average particle size of about 1 micrometer in the following amounts to produce:

| | $SrCo_{0.8}Fe_{0.2}O_{3-\delta}$ | | Pd | |
|---|---|---|---|---|
| Sample A | 90 vol % | 80.65 wt % | 10 vol % | 19.35 wt % |
| Sample B | 80 vol % | 64.8 wt % | 20 vol % | 35.02 wt % |
| Sample C | 70 vol % | 51.98 wt % | 30 vol % | 48.02 wt % |
| Sample D | 65 vol % | 46.3 wt % | 35 vol % | 53.70 wt % |
| Sample E | 60 vol % | 41.02 wt % | 40 vol % | 58.98 wt % |
| Sample F | 50 vol % | 31.68 wt % | 50 vol % | 68.32 wt % | and each sample milled in a methanol solution in an attrition mill for 24 hours and the green composite bodies obtained as described in Example I. The green samples were sintered in air at 1250° C. for five hours and the densities were measured to be greater than 95 percent of the theoretical density.

The samples were characterized using x-ray diffraction and an optical microscope for phase identification which confirmed that each of the samples had a $SrCo_{0.8}Fe_{0.2}O_{3-\delta}$ phase and a Pd phase. A 20 mm diameter and 4 mm thick pellet of $SrCo_{0.8}Fe_{0.2}O_3$, ceramic material prepared as above, with well controlled heating and cooling rates during sintering is shown in FIG. 1 as a photomicrograph of an as-sintered sample showing cracks in the sintered body. FIG. 2 shows a photomicrograph, at the same magnification as FIG. 1, of the same size pellet obtained by the same treatment from Sample D $(SrCo_{0.8}Fe_{0.2}O_{3-\delta})_{65vol\%}Pd_{35vol\%}$ showing that neither macro nor micro cracking was present in the composite ceramic/metal material.

EXAMPLE III

A mixed ionic-electronic conductive solid solution powder of $La_{0.2}Ba_{0.8}Co_{0.8}Fe_{0.2}O_{3-\delta}$ was formed by calcination as described in Example I. The mixture of 10.28 wt % $LaCO_3$, 31.69 wt % BaO, 49.78 wt % $Co_3O_4$, and 8.25 wt % $Fe_2O_3$ having average particle size of about 10 micrometers was ground in a methanol solution in an attrition mill, the slurry dried in air, and calcined at 900° C. in air for 10 hours to form the solid solution phase. This powder was mixed with a $Ag_{30wt\%}/Pd_{70wt\%}$ alloy powder having an average particle size of about 1 micrometer in the following amounts to produce:

| | $La_{0.2}Ba_{0.8}Co_{0.8}Fe_{0.2}O_{3-\delta}$ | | $Ag_{30 wt \%}Pd_{70 wt \%}$ | |
|---|---|---|---|---|
| Sample A | 90 vol % | 83.3 wt % | 10 vol % | 16.7 wt % |
| Sample B | 75 vol % | 62.4 wt % | 25 vol % | 37.6 wt % |
| Sample C | 60 vol % | 45.4 wt % | 40 vol % | 57.4 wt % | and each sample milled in a methanol solution in an attrition mill for 24 hours and the green composite bodies obtained as described in Example I. The green samples were sintered in air at 1250° C. for 5 hours and the densities were measured to each be greater than 95 percent of the theoretical density.

The samples were characterized using x-ray diffraction and an optical microscope for phase identification which confirmed that each of the samples had a $La_{0.2}Ba_{0.8}Co_{0.8}Fe_{0.2}O_{3-\delta}$ ceramic phase and a Pd/Ag metal alloy phase. The four point bend test and short rod fracture toughness test results showed that the fracture strength $\sigma_f$ and the critical stress intensity factor (mode I) $K_{Ic}$ were increased about one order of magnitude compared to the pure ceramic material $La_{0.2}Ba_{0.8}Co_{0.8}Fe_{0.2}O_{3-\delta}$. The results are shown in the following Table.

TABLE 2

| | Material | | | Critical Stress |
|---|---|---|---|---|
| | Ceramic vol % | Metal vol % | Fracture Strength $\sigma_f$(MPa) | Intensity Factor $K_{Ic}$ |
| | 100 | 0 | 29.73 ± 2.6 | * |
| A | 90 | 10 | 36.01 ± 1.1 | 1.37 ± 0.01 |
| B | 75 | 25 | 71.78 ± 2.6 | 2.77 ± 0.02 |
| C | 60 | 40 | 230.69 ± 13.2 | Not Measured |

*Without metal phase, the material cracked and its $K_{Ic}$ was not measured.

EXAMPLE IV

A solid ionic conductive solid solution powder of $Bi_{1.5}Y_{0.5}O_3$ was formed by calcination as described in Example I. Mixed powder of 86.10 wt % $Bi_2O_3$ and 13.90 wt % $Y_2O_3$ having average particle size of about 10 micrometers was ground in a methanol solution in an attrition mill, slurry dried in air, and calcined at 750° C. in air for 10 hours to form the solid solution phase. This powder was mixed with the indicated Ag-containing powder having an average particle size of about 1 micrometer to produce 65 vol % ceramic phase and 35 vol % metal phase:

| | $Bi_{1.5}Y_{0.5}O_3$ | Ag-containing Metal |
|---|---|---|
| Sample A | 57.7 wt % | 42.3 wt % $Ag_2O$ |
| Sample B | 59.5 wt % | 40.5 wt % Ag |
| Sample C | 57.3 wt % | 42.7 wt % ($Ag_{70 wt \%}Pd_{30 wt \%}$) | and each sample milled in a methanol solution in an attrition mill for 24 hours and the green composite bodies obtained as described in Example I. The green samples were sintered in air at 930° C. for 5 hours and the densities were measured to each be greater than 95 percent of the theoretical density.

The samples were characterized using x-ray diffraction and an optical microscope for phase identification which confirmed that each of the samples had a $Bi_{1.5}Y_{0.5}O_3$ ceramic phase and a Ag or Ag/Pd metal alloy phase. The four point bend test and short rod fracture toughness test results showed that the fracture strength $\sigma_f$ and the critical stress intensity factor (mode I) $K_{Ic}$ were increased about one order of magnitude compared to the pure ceramic material $Bi_{1.5}Y_{0.5}O_3$. The results are shown in the following Table.

TABLE 3

| | Material | | Critical Stress | |
|---|---|---|---|---|
| | Ceramic vol % | Metal vol % | Fracture Strength $\sigma_f$(MPa) | Intensity Factor $K_{Ic}$ |
| | 100 | 0 | 24.4 ± 1.6 | 0.46 ± 0.02 |
| A | 65 | 35 Ag | 109.8 ± 9.1 | 4.12 ± 0.12 |
| B | 65 | 35 Ag | 87.9 ± 5.6 | Not measured |
| C | 65 | 35 Ag/Pd | 90.6 ± 18 | 2.78 ± 0.20 |

EXAMPLE V

The following six mixed ionic-electronic conducting composite ceramic materials were fabricated:

A $[(CeO_2)_{88mol\%}(CaO)_{12mol\%}]_{90vol\%}[Pd]_{10vol\%}$
B $[(CeO_2)_{88mol\%}(CaO)_{12mol\%}]_{80vol\%}[Pd]_{20vol\%}$
C $[(CeO_2)_{88mol\%}(CaO)_{12mol\%}]_{70vol\%}[Pd]_{30vol\%}$
D $[(CeO_2)_{88mol\%}(CaO)_{12mol\%}]_{65vol\%}[Pd]_{35vol\%}$
E $[(CeO_2)_{88mol\%}(CaO)_{12mol\%}]_{60vol\%}[Pd]_{40vol\%}$
F $[(CeO_2)_{88mol\%}(CaO)_{12mol\%}]_{50vol\%}[Pd]_{50vol\%}$ The following powders were ground in the required weight ratios for 24 hours in an attrition mill in the presence of methanol and treated as described in Example I to obtain green composite bodies having diameters of 24 mm and thickness of 1.5 mm.

A 81.35 weight % $(CeO_2)_{88mol\%}(CaO)_{12mol\%}$ 18.67 weight % Pd

B 65.94 weight % $(CeO_2)_{88mol\%}(CaO)_{12mol\%}$ 34.06 weight % Pd

C 53.04 weight % $(CeO_2)_{88mol\%}(CaO)_{12mol\%}$ 46.96 weight % Pd

D 47.34 weight % $(CeO_2)_{88mol\%}(CaO)_{12mol\%}$ 52.66 weight % Pd

E 42.06 weight % $(CeO_2)_{88mol\%}(CaO)_{12mol\%}$ 57.93 weight % Pd

F 32.62 weight % $(CeO_2)_{88mol\%}(CaO)_{12mol\%}$ 67.39 weight % Pd

The green samples A–F were fired at 1450° C. in air for 5 hours. The theoretical densities were obtained from measured x-ray diffraction patterns and measured densities obtained by the Archimedes method.

| | Measured Density (g/cm³) | Theoretical Density (g/cm³) |
|---|---|---|
| A | 7.09 | 7.39 |
| B | 7.79 | 8.10 |
| C | 8.34 | 8.82 |
| D | 8.77 | 9.17 |
| E | 9.15 | 9.53 |
| F | 9.87 | 10.24 |

The samples had a ceramic phase and a metal phase and were used in an oxygen concentration cell for measurement of ionic transference numbers ($t_i$) of the mixed ionic-electronic conductive composites and for measurement of oxygen permeation, both over a temperature range of 700° to 1000° C. The samples showed good physical and mechanical properties following these measurements and did not exhibit cracking.

EXAMPLE VI

The following six mixed ionic-electronic conducting composite ceramic materials were fabricated:

A $[(ZrO_2)_{92mol\%}(Y_2O_3)_{8mol\%}]_{90vol\%}[Pd]_{10vol\%}$
B $[(ZrO_2)_{92mol\%}(Y_2O_3)_{8mol\%}]_{80vol\%}[Pd]_{20vol\%}$
C $[(ZrO_2)_{92mol\%}(Y_2O_3)_{8mol\%}]_{70vol\%}[Pd]_{30vol\%}$
D $[(ZrO_2)_{92mol\%}(Y_2O_3)_{8mol\%}]_{65vol\%}[Pd]_{35vol\%}$
E $[(ZrO_2)_{92mol\%}(Y_2O_3)_{8mol\%}]_{60vol\%}[Pd]_{40vol\%}$
F $[(ZrO_2)_{92mol\%}(Y_2O_3)_{8mol\%}]_{50vol\%}[Pd]_{50vol\%}$ The following powders were ground in the required weight ratios for 24 hours in an attrition mill in the presence of methanol and treated as described in Example I to obtain green composite bodies having diameters of 24 mm and thickness of 1.5 mm.

A 79.37 weight % $(ZrO_2)_{92mol\%}(Y_2O_3)_{8mol\%}$ 20.63 weight % Pd

B 63.10 weight % $(ZrO_2)_{92mol\%}(Y_2O_3)_{8mol\%}$ 36.90 weight % Pd

C 50.00 weight % $(ZrO_2)_{92mol\%}(Y_2O_3)_{8mol\%}$ 50.00 weight % Pd

D 44.26 weight % $(ZrO_2)_{92mol\%}(Y_2O_3)_{8mol\%}$ 55.74 weight % Pd

E 39.06 weight % $(ZrO_2)_{92mol\%}(Y_2O_3)_{8mol\%}$ 60.94 weight % Pd

F 29.92 weight % $(ZrO_2)_{92mol\%}(Y_2O_3)_{8mol\%}$ 70.08 weight % Pd

The green Samples A–F were fired at 1450° C. in air for 5 hours. The theoretical densities were obtained from measured x-ray diffraction patterns and measured densities obtained by the Archimedes method.

| | Measured Density (g/cm³) | Theoretical Density (g/cm³) |
|---|---|---|
| A | 6.36 | 6.69 |
| B | 7.13 | 7.48 |
| C | 7.87 | 8.27 |
| D | 8.32 | 8.67 |
| E | 8.68 | 9.07 |
| F | 9.38 | 9.85 |

The samples had a ceramic phase and a metal phase and were used in an oxygen concentration cell for measurement of ionic transference numbers ($t_i$) of the mixed ionic-electronic conductive composites and for measurement of oxygen permeation, both over a temperature range of 700° to 1000° C. The samples showed good physical and mechanical properties following these measurements and did not exhibit cracking.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for enhancement of mechanical properties of mixed ionic and electronic conducting composite ceramic gas impervious membranes comprising, forming a mixture of about 50 to about 90 volume percent ceramic powder and about 10 to about 50 volume percent metal powder of a high-temperature oxidation resistant metal, each of said powders having average powder sizes of less than about 50 micrometers, forming a green body of said mixture, and sintering said green body in an oxidation atmosphere at a temperature and for a time to obtain a high density of greater than about 95 percent of the theoretical value forming a composite membrane about 1 to about 50 microns thick of said ceramic and metal having a non-homogeneous microstructure of a predominantly ionic conducting continuous phase and a predominantly electronic conducting continuous phase providing ionic conduction across said membrane by pressure differential and exhibiting enhanced mechanical properties compared to said ceramic alone.

2. A process according to claim 1 wherein sintering said green body is conducted in air.

3. A process according to claim 1 wherein sintering said green body is conducted in said oxidation atmosphere having an oxygen partial pressure of about $10^{-6}$ to about 1 atmosphere.

4. A process according to claim 1 wherein said mixture comprises about 60 to about 80 volume percent said ceramic powder and about 20 to about 40 volume percent said metal powder.

5. A process according to claim 1 wherein fracture strength $\sigma_f$ is increased at least about 20 percent compared to a 100 percent ceramic membrane of said ceramic powder.

6. A process according to claim 1 wherein critical stress intensity factor (mode I) $K_{Ic}$ is increased at least about 20 percent compared to a 100 percent ceramic membrane of said ceramic powder.

7. A process according to claim 1 wherein said ceramic powder and said metal powder have average particle sizes of about 1 to about 10 micrometers.

8. A process according to claim 1 wherein said metal is selected from the group consisting of Cu, Ag, Au, Zn, Cd, Mo, Fe, Ru, Os, Co, Rb, Ir, Ni, Pd, Pt and mixtures and alloys thereof.

9. A process according to claim 1 wherein said metal is selected from the group consisting of Ag, Pd, Pt, Au and their alloys.

10. A process according to claim 1 wherein said ceramic is selected from the group of ionic conductors consisting of oxygen ion conductors, sodium ion conductors, hydrogen ion conductors, silver ion conductors, sodium ion conductors, lithium ion conductors, copper ion conductors, fluoride ion conductors, and mixed ionic-electronic conducting perovskite materials and their derivative forms.

11. A process according to claim 1 wherein said ceramic is selected from the group consisting of cubic $Bi_2O_3$ cubic $CeO_2$ cubic $HfO_2$ cubic $ThO_2$, and cubic $ZrO_2$ oxygen ion conductors.

12. A process according to claim 1 wherein said ceramic is selected from the group consisting of oxides of metals selected from the group consisting of Bi, Ce, Th, Na, Cr, Y, Nb, Rb, Sr, Ba, Ni, Zr, La, Fe, Co, Mo, Hf, Ti, Cr and mixtures thereof.

13. A process according to claim 1 wherein said ceramic powder is yttrium stabilized $Bi_2O_3$ and said metal is present in about 20 to about 50 volume percent.

14. A process according to claim 1 wherein said ceramic is selected from the group consisting of a perovskite, a derivative form of a perovskite, and mixtures thereof.

15. A process according to claim 1 wherein said ceramic is a perovskite selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $Bi_{1-z}Sr_zCo_{1-w}Fe_wO_{3-\delta}$, $La_{1-z}Ba_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive number of about 0.01 to about 0.8; w is a positive numeral of about 0.01 to about 0.8; and δ is a number of 0 to a positive or negative number of about 0.3 to satisfy valence requirements.

16. A mixed ionic and electronic conducting sintered ceramic/metal composite gas impervious membrane about 1 to about 50 microns thick having a non-homogeneous mixed microstructure comprising about 50 to about 90 volume percent ceramic phase and about 10 to about 50 volume percent high-temperature oxidation resistant metal phase uniformly distributed in said ceramic phase, said membrane having a predominantly ionic conducting continuous ceramic phase and a predominantly electronic conducting metal phase providing ionic conduction across said membrane by pressure differential and exhibiting enhanced mechanical properties, compared to said ceramic alone, of increased fracture strength $\sigma_f$ of at least about 20 percent and increased critical stress intensity factor (mode I) $K_{Ic}$ of at least about 20 percent.

17. A mixed ionic and electronic conducting sintered ceramic/metal composite membrane according to claim 16 comprising about 60 to about 80 volume percent ceramic phase and about 20 to about 40 volume percent metal phase.

18. A mixed ionic and electronic conducting sintered ceramic/metal composite membrane according to claim 16 wherein said metal is selected from the group consisting of Cu, Ag, Au, Zn, Cd, Mo, Fe, Ru, Os, Co, Rb, Ir, Ni, Pd, Pt and mixtures and alloys thereof.

19. A mixed ionic and electronic conducting sintered ceramic/metal composite membrane according to claim 16 wherein said metal is selected from the group consisting of Ag, Pd, Pt, Au and their alloys.

20. A mixed ionic and electronic conducting sintered ceramic/metal composite membrane according to claim 16 wherein said ceramic is selected from the group of ionic conductors consisting of oxygen ion conductors, sodium ion conductors, hydrogen ion conductors, silver ion conductors, sodium ion conductors, lithium ion conductors, copper ion conductors, fluoride ion conductors, and mixed ionic-electronic conducting perovskite materials and their derivative forms.

21. A mixed ionic and electronic conducting sintered ceramic/metal composite membrane according to claim 16 wherein said ceramic is selected from the group consisting of cubic $Bi_2O_3$, cubic $CeO_2$, cubic $HfO_2$, cubic $ThO_2$, and cubic $ZrO_2$ oxygen ion conductors.

22. A mixed ionic and electronic conducting sintered ceramic/metal composite membrane according to claim 16 wherein said ceramic is selected from the group consisting of oxides of metals selected from the group consisting of Bi, Ce, Th, Na, Cr, Y, Nb, Rb, Sr, Ba, Ni, Zr, La, Fe, Co, Mo, Hf, Ti, Cr and mixtures thereof.

23. A mixed ionic and electronic conducting sintered ceramic/metal composite membrane according to claim 16 wherein said ceramic is yttrium stabilized $Bi_2O_3$ and said metal is present in about 20 to about 50 volume percent.

24. A mixed ionic and electronic conducting sintered ceramic/metal composite membrane according to claim 16 wherein said ceramic is selected from the group consisting of a perovskite, a derivative form of a perovskite, and mixtures thereof.

25. A mixed ionic and electronic conducting sintered ceramic/metal composite membrane according to claim 16 wherein said ceramic is a perovskite selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $Bi_{1-z}Sr_zCo_{1-w}Fe_wO_{3-\delta}$, $La_{1-z}Ba_zCo_{1-w}Fe_wO_{3-67}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive number of about 0.01 to about 0.8; w is a positive numeral of about 0.01 to about 0.8; and δ is a number of 0 to a positive or negative number of about 0.3 to satisfy valence requirements.

26. A mixed ionic and electronic conducting sintered ceramic/metal composite membrane according to claim 16 wherein fracture strength $\sigma_f$ is increased at least about 20 percent compared to a 100 percent ceramic membrane of said ceramic.

27. A mixed ionic and electronic conducting sintered ceramic/metal composite membrane according to claim 16 wherein critical stress intensity factor (mode I) $K_{Ic}$ is increased at least about 20 percent compared to a 100 percent ceramic membrane of said ceramic.

* * * * *

UNITED STATES PATENT AND TRADEMARK OFFICE
CERTIFICATE OF CORRECTION

PATENT NO. : 5,624,542
DATED : April 29, 1997
INVENTOR(S) : Yousheng Shen, et. al.

It is certified that error appears in the above-identified patent and that said Letters Patent is hereby corrected as shown below:

Column 13, line 50, delete ", Cr".

Column 14, line 40, delete "cubic $Bi_2O_3$ ," and in its place insert --cubic $Bi_2O_3$,--.

Column 14, line 62, delete "$La_{1-z}Ba_zCo_{1-w}Fe_wO_{3-67}$ ," and in its place insert --$La_{1-z}Ba_zCo_{1-w}Fe_wO_{3-\delta}$--.

Signed and Sealed this

Twenty-third Day of December, 1997

Attest:

BRUCE LEHMAN

Attesting Officer

Commissioner of Patents and Trademarks